US012571592B2

(12) United States Patent
Chang et al.

(10) Patent No.: US 12,571,592 B2
(45) Date of Patent: Mar. 10, 2026

(54) CRUCIBLE LIFTING DEVICE

(71) Applicant: KENMEC MECHANICAL ENGINEERING CO., LTD., Taipei City (TW)

(72) Inventors: Shih-Chen Chang, Taipei City (TW); Chih-Chun Ko, Taipei City (TW)

(73) Assignee: KENMEC MECHANICAL ENGINEERING CO., LTD., Taipei City (TW)

( * ) Notice: Subject to any disclaimer, the term of this patent is extended or adjusted under 35 U.S.C. 154(b) by 413 days.

(21) Appl. No.: 18/482,047

(22) Filed: Oct. 6, 2023

(65) Prior Publication Data

US 2025/0020408 A1 Jan. 16, 2025

(30) Foreign Application Priority Data

Jul. 14, 2023 (TW) ................................ 112126344

(51) Int. Cl.
*F27B 14/08* (2006.01)
*F27B 14/04* (2006.01)

(52) U.S. Cl.
CPC .............. *F27B 14/08* (2013.01); *F27B 14/04* (2013.01); *F27B 2014/045* (2013.01); *F27B 2014/0825* (2013.01)

(58) Field of Classification Search
CPC .. F27B 14/08; F27B 14/04; F27B 2014/0825; F27B 14/10; F27B 14/12; F27B 2014/045
See application file for complete search history.

(56) References Cited

U.S. PATENT DOCUMENTS

| | | | | | |
|---|---|---|---|---|---|
| 2,966,709 | A | * | 1/1961 | Winters ................. | B22D 27/15 164/150.1 |
| 4,627,482 | A | * | 12/1986 | Waterstrat .............. | B22D 23/06 164/253 |

FOREIGN PATENT DOCUMENTS

| | | | | | |
|---|---|---|---|---|---|
| CN | 104028729 | A | * | 9/2014 | |
| CN | 111912224 | A | * | 11/2020 | .............. F27B 14/08 |
| CN | 111928652 | A | * | 11/2020 | .............. F27B 14/04 |
| CN | 113203285 | A | * | 8/2021 | .............. F27B 14/08 |
| CN | 113737049 | A | * | 12/2021 | ........... H10H 20/857 |
| CN | 113758252 | A | * | 12/2021 | .............. F27B 14/10 |
| CN | 114087873 | A | * | 2/2022 | .............. F27B 14/04 |
| CN | 115742425 | A | * | 3/2023 | |
| CN | 116294594 | A | * | 6/2023 | .............. F27B 14/06 |
| EP | 0388235 | A2 | * | 9/1990 | ............. B22D 18/06 |

* cited by examiner

*Primary Examiner* — Gregory A Wilson

(57) ABSTRACT

A crucible lifting device includes a vacuum chamber, a vacuum chamber lower seat and a crucible lifting assembly. The vacuum chamber lower seat is arranged orthogonally at the bottom of the vacuum chamber, the vacuum chamber lower seat including a plurality of coupling parts arranged orthogonally at the vacuum chamber lower seat and on a side away from the vacuum chamber. The crucible lifting assembly is arranged on the vacuum chamber lower seat and on the side away from the vacuum chamber. The crucible lifting assembly includes a plurality of multi-rotation angle guides, one end of each multi-rotation angle guide connected to each coupling part; a plurality of guide rods, one end of each guide rod connected to the other end of each multi-rotation angle guide; and a plurality of guide rod accommodating parts, each guide rod accommodating part configured to correspond to each guide rod.

10 Claims, 2 Drawing Sheets

CRUCIBLE LIFTING DEVICE

CROSS-REFERENCE TO RELATED APPLICATION

This application claims the priority benefit of Taiwanese Patent Application Serial Number 112126344, filed on Jul. 14, 2023, the full disclosure of which is incorporated herein by reference.

BACKGROUND

Technical Field

The present invention relates to a lifting device, and in particular, to a crucible lifting device.

Related Art

The crucible needs to be raised or lowered in a timely manner for process requirements. Since the weight of the crucible is quite heavy, if it is carried manually, it may not be moved. What's more, even if it can be moved, if you are not careful, the crucible would be damaged, resulting in great losses. Therefore, the crucible lifting device is used to facilitate the process.

The conventional crucible lifting device includes a vacuum chamber, a vacuum chamber lower seat and a crucible lifting assembly. The vacuum chamber lower seat is arranged at the bottom of the vacuum chamber and is arranged orthogonally to the bottom of the vacuum chamber. The vacuum chamber lower seat is provided with a plurality of coupling parts arranged away from the bottom of the vacuum chamber, and the coupling parts are arranged orthogonally to the vacuum chamber lower seat. The crucible lifting assembly has a crucible lower seat plate, a plurality of guide rods, a guide rod support plate and a plurality of guide rod accommodation parts. The crucible lower seat plate is disposed close to the vacuum chamber lower seat. A plurality of crucible lower seat through holes are formed on the lower seat plate body. One end of the guide rods has a coupling hole. The coupling holes are combined with the side of the crucible lower base plate away from the vacuum chamber lower seat. The through hole of the lower base of the crucible is communicated with the coupling hole, so that the coupling member can movably penetrate the through hole of the lower seat of the crucible and be combined with the coupling hole. The guide rod support plate is arranged on a side away from the vacuum chamber lower seat and close to the lower seat of the crucible. A plurality of guide rod penetration holes are formed on the guide rod support plate. Each guide rod accommodation part is provided on a side of the guide rod support plate away from the crucible lower base plate, so that the other end of each guide rod can be movably inserted into each guide rod accommodation part through each guide rod penetration hole.

However, in the conventional crucible lifting device, when the coupling hole is combined with the coupling member, it is limited by the vacuum chamber lower seat, the crucible lower seat plate, the coupling members, the crucible lower seat penetration hole, the crucible lower seat lower base plate, the guide rods, the guide rod support plate and the guide rod accommodating parts. When one of the above-mentioned assembly is not precise enough, it would take a lot of time to calibrate when assembling and combining them, which would affect the overall production efficiency.

Therefore, it is extremely desirous for the existing technology to further provide more improved solutions.

SUMMARY

In view of the above-mentioned deficiencies in the prior art, the main purpose of the present invention is to provide a crucible lifting device that utilizes a device that can dynamically change the angle to avoid calibration requiring a lot of manpower and time arisen from insufficient precision of each component during combination to achieve the purpose of improving overall production efficiency.

The crucible lifting device according to one embodiment of the disclosure includes a vacuum chamber, a vacuum chamber lower seat and a crucible lifting assembly. The vacuum chamber lower seat is arranged orthogonally at the bottom of the vacuum chamber, the vacuum chamber lower seat including a plurality of coupling parts arranged orthogonally at the vacuum chamber lower seat and on a side away from the vacuum chamber. The crucible lifting assembly is arranged on the vacuum chamber lower seat and on the side away from the vacuum chamber. The crucible lifting assembly includes a plurality of multi-rotation angle guides, one end of each multi-rotation angle guide connected to each coupling part; a plurality of guide rods, one end of each guide rod connected to the other end of each multi-rotation angle guide; and a plurality of guide rod accommodating parts, each guide rod accommodating part configured to correspond to each guide rod.

Through the above structure, the multi-rotation angle guides are provided on the crucible lifting assembly to match the coupling parts. When the crucible lifting assembly is close to the coupling parts on the lower seat of the vacuum chamber, through the one-to-one combination of the multi-rotation angle guide parts and the coupling parts, the precision required for each component during the coupling is appropriately reduced. By reducing processing costs and the time required for calibration during assembly and combination, the overall production efficiency can be improved.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
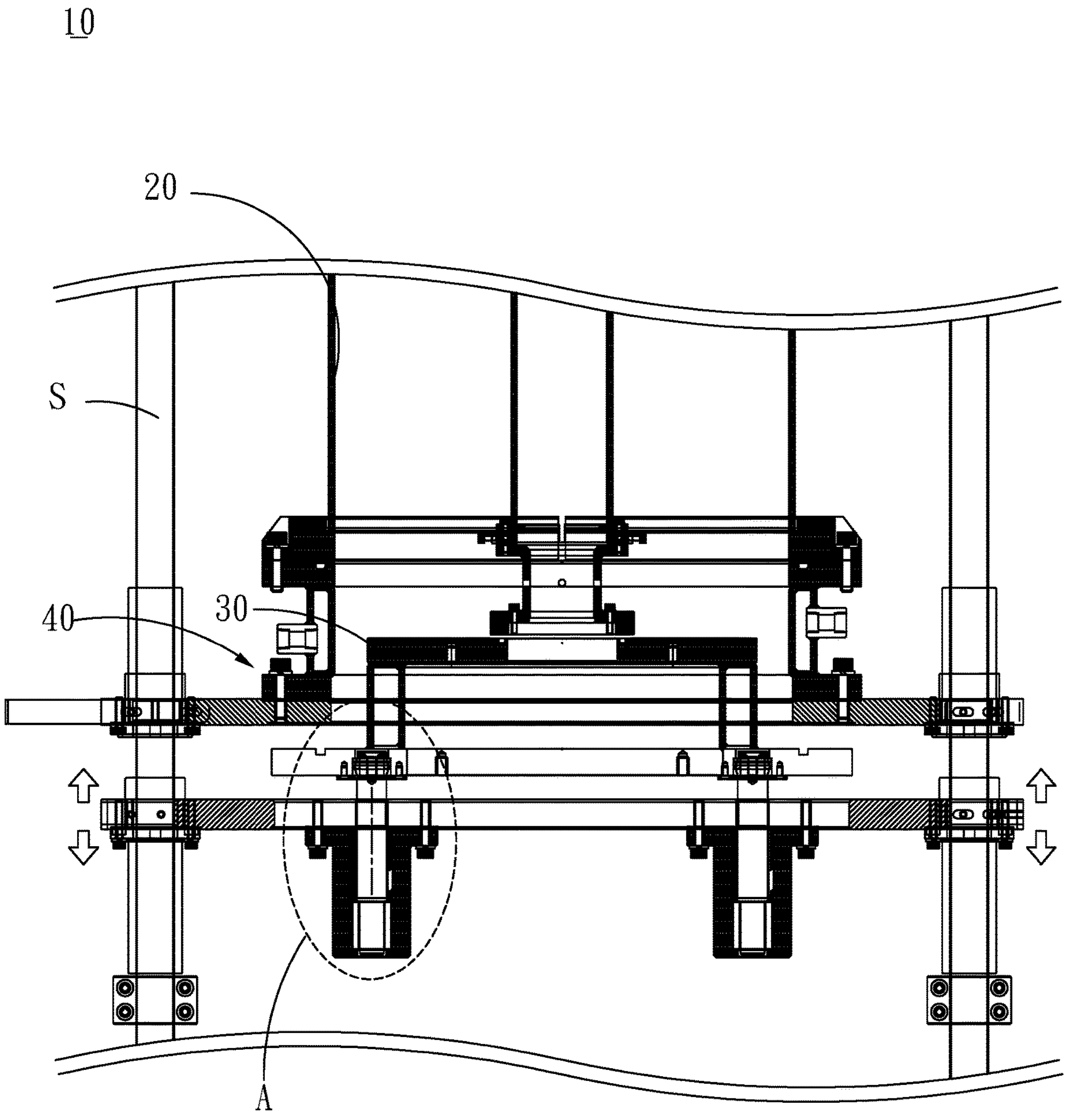
FIG. 1 is a partial structural diagram of the crucible lifting device of the present invention.

Regarding the preferred embodiment of the crucible lifting device of the present invention, as shown in FIG. 1, the crucible lifting device 10 includes a vacuum chamber 20, a vacuum chamber lower seat 30 and a crucible lifting assembly 40. A vacuum environment is formed in the vacuum chamber 20, and the vacuum chamber lower seat 30 is a plate. The vacuum chamber lower seat 30 is orthogonal to the side wall of the vacuum chamber 20. The vacuum chamber lower seat 30 is disposed in the bottom of the vacuum chamber 20. The crucible lifting assembly 40 is disposed on the vacuum chamber the lower seat 30 and on a side away from the vacuum chamber 20. When the crucible lifting assembly 40 is lifted upward through the plurality of guide rods S, the crucible lifting assembly 40 is close to the vacuum chamber lower seat 30.

Figure 2:
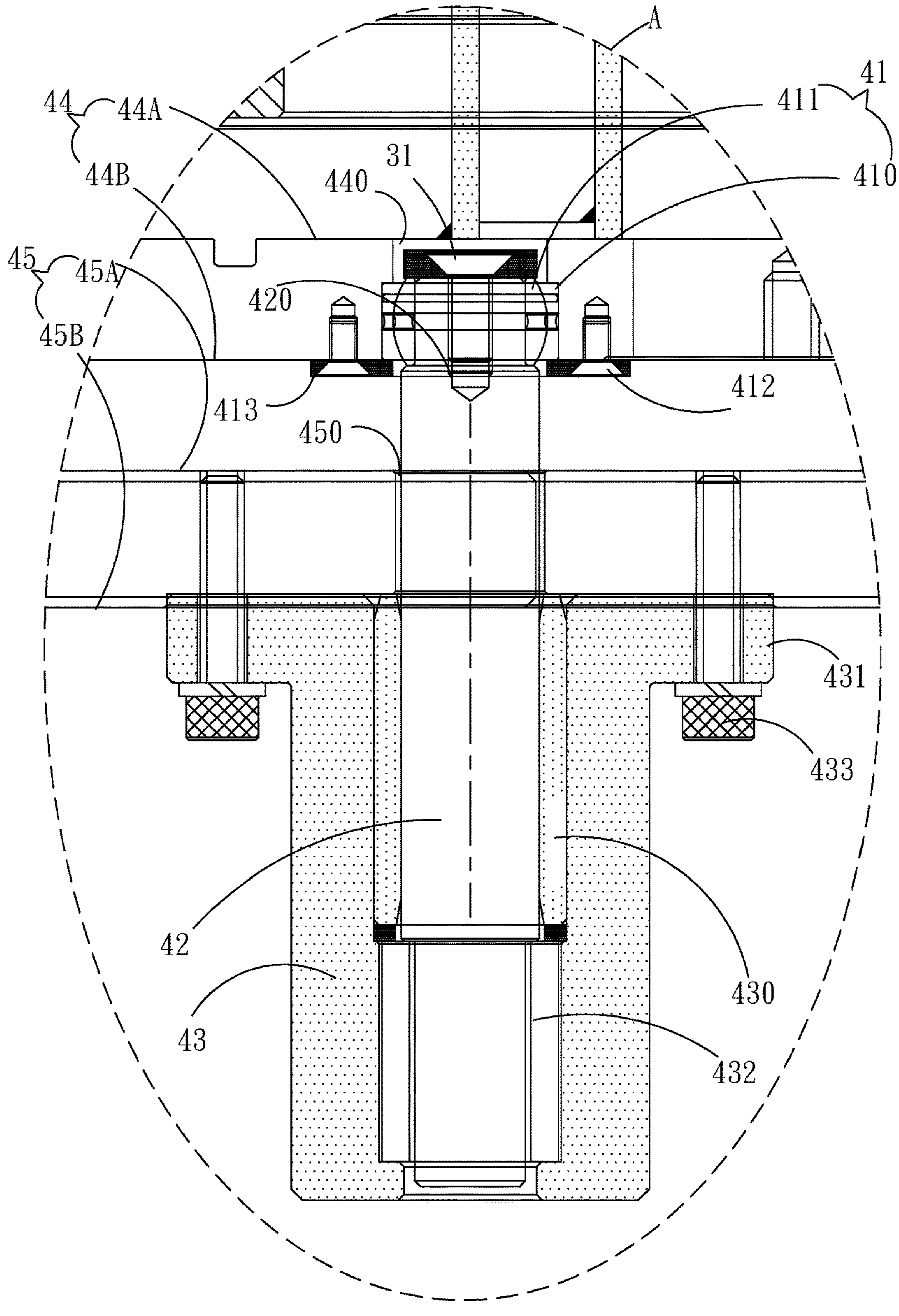
FIG. 2 is a partial enlarged view of area A of the crucible lifting device of the present invention.

For details, please refer to FIG. 2 as well. The vacuum chamber lower seat 30 includes a plurality of coupling parts 31. The coupling parts 31 are arranged orthogonally to the vacuum chamber lower seat 30 and the side away from the vacuum chamber 20. The crucible lifting assembly 40 includes a plurality of multi-rotation angle guides 41, a plurality of guide rods 42 and a plurality of guide rod accommodating parts 43. One end of each multi-rotation angle guide member 41 is connected to each coupling part 31 in a matching manner. One end of each guide rod 42 is connected to the other end of each multi-rotation angle guide 41. Each guide rod accommodating part 43 is arranged to match each guide rod 42 so that each guide rod 42 can movably penetrate into each guide rod accommodating part 43. In this embodiment, the coupling parts 31 may be plugs.

Through the above-mentioned multi-rotation angle guides 41, when the crucible lifting assembly 40 is lifted upward toward the vacuum chamber lower seat 30, the multi-rotation angle guides 41 can be combined with at various angles to avoid insufficient precision and the need to spend more calibration time.

In this embodiment, one end of the guide rods 42 has a tooth hole 420. The tooth hole 420 provides the coupling parts 31 for insertion and coupling. Specifically, the coupling parts 31 respectively penetrate one end of the multi-rotation angle guide members 41 and continue to pass out from the other end of the multi-rotation angle guide members 41. Then, the coupling parts 31 are penetrated into the tooth hole 420 to be combined with the guide rods 42.

In this embodiment, the crucible lifting assembly 40 further includes a first plate 44 and a second plate 45. The first plate 44 is arranged in parallel below the vacuum chamber lower seat 30. The second plate 45 is arranged in parallel below the first plate 44. Specifically, the vacuum chamber lower seat 30, the first plate 44 and the second plate 45 are arranged parallel to each other. The first plate 44 is disposed between the vacuum chamber lower seat 30 and the second plate 45.

Further, the first plate 44 has a first surface 44A and a second surface 44B. The first surface 44A and the second surface 44B are arranged parallel to each other. the second plate 45 has a third surface 45A and a fourth surface 45B. The third surface 45A and the fourth surface 45B are arranged parallel to each other. A plurality of through holes 440 are formed on the first surface 44A and the second surface 44B of the first plate 44. Each through hole 440 provides one-to-one matching accommodation for each multi-rotation angle guide 41.

The second plate 45 penetrates the third surface 45A and the fourth surface 45B to form a plurality of through holes 450. Each guide rod 42 can movably penetrate through each through hole 450 by one-to-one correspondence. In this embodiment, the number of the through holes 440 is at least four, and they are formed on four opposite sides of the first plate 44 to combine with the vacuum chamber lower base more firmly 30.

In this embodiment, each multi-rotation angle guide 41 includes a spherical side wall 410, a sliding member 411 and a plurality of fixing members 412. The spherical side wall 410 is closely arranged with the hole wall of each through hole 440 and is bent and extended outward to form a fixing surface 413. The sliding member 411 is rotatably accommodated in the spherical side wall 410. The two opposite sides of the sliding member 411 provide a connection between one of the coupling parts 31 and one of the guide rods 42 to avoid wasting calibration time. The fixing members 412 respectively penetrate the fixing surface 413 and the second surface 44B. Specifically, the spherical side wall 410 has a spherical cross-section. The spherical side wall 410 is attached along the wall of each through hole 440 and along the second surface 44B, so that the spherical side wall 410 has a coaxial through hole with the through holes 440. The sliding member 411 is rotatably arranged in the through hole. The friction coefficient between the sliding member 411 and the spherical side wall 410 is very small, so that the sliding member 411 can rotate relative to the spherical side wall 410. The sliding member 411 has a through hole concentric with the through hole 440 of the spherical side wall 410 to provide insertion and coupling of the coupling parts 31. The fixing parts 412 tightly fix the fixing surface 413 to the second surface 44B to fix each multi-rotation angle guide part 41. In this embodiment, the number of the multi-rotation angle guides 41 is at least four, and the multi-rotation angle guide 41 can be a fisheye bearing. There are at least two fixing members 412, and the two fixing members 412 are disposed oppositely on two opposite sides of the fixing surface 413. The fixing members 412 can be screws.

By arranging a plurality of multi-rotation angle guides 41 as described above, when the crucible lifting assembly 40 rises, the multi-rotation angle guides 41 at different positions can appropriately couple the coupling parts 31 at different angles. In this way, the time-consuming calibration required during combination can be significantly reduced.

In this embodiment, each of the guide rod accommodating parts 43 includes a linear bearing 430, a flange 431, a compression spring 432 and a plurality of locking parts 433. This linear bearing 430 can make each guide rod 42 slide up and down in a limited position. The flange 431 is disposed at one end of the linear bearing 430 and close to the fourth surface 45B. The compression spring 432 is disposed in the linear bearing 430 and away from the flange 431. When the crucible lifting assembly 40 is raised, it is used to buffer the first plate 44. The locking parts 433 are screwed to the flange 431 to fix the flange on the fourth surface 45B.

Through the above structure, the multi-rotation angle guides are provided on the crucible lifting assembly to match the coupling parts. When the crucible lifting assembly is close to the coupling parts on the lower seat of the vacuum chamber, through the one-to-one combination of the multi-rotation angle guide parts and the coupling parts, the precision required for each component during the coupling is appropriately reduced. By reducing processing costs and the time required for calibration during assembly and combination, the overall production efficiency can be improved.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A crucible lifting device, comprising:

a vacuum chamber;

a vacuum chamber lower seat arranged orthogonally at the bottom of the vacuum chamber, the vacuum chamber lower seat comprising a plurality of coupling parts arranged orthogonally at the vacuum chamber lower seat and on a side away from the vacuum chamber;

a crucible lifting assembly arranged on the vacuum chamber lower seat and on the side away from the vacuum chamber, the crucible lifting assembly comprising:

a plurality of multi-rotation angle guides, one end of each multi-rotation angle guide connected to each coupling part;

a plurality of guide rods, one end of each guide rod connected to the other end of each multi-rotation angle guide; and a plurality of guide rod accommodating parts, each guide rod accommodating part configured to correspond to each guide rod.

2. The device according to claim 1, wherein the crucible lifting assembly further comprises:

a first plate, which is arranged in parallel below the vacuum chamber lower seat; and a second plate body, which is arranged parallel below the first plate.

3. The device according to claim 2, wherein the first plate has a first surface and a second surface, and the first surface is parallel to the second surface; a plurality of through holes are formed on the first surface and the second surface of the first plate.

4. The device according to claim 3, wherein the multi-rotation angle guides are accommodated in the through holes in a one-to-one correspondence.

5. The device according to claim 4, wherein each of the multi-rotation angle guides comprises:

a spherical side wall, which is closely arranged with the wall of each through hole and extends outward to form a fixing surface;

a sliding member slidably accommodated in the spherical side wall; and a plurality of fixing parts, each of which penetrating the fixing surface and the second surface.

6. The device according to claim 2, wherein the second plate has a third surface and a fourth surface, and the third surface is parallel to the fourth surface; a plurality of through holes are formed on the third surface and the fourth surface of the first plate.

7. The device according to claim 6, wherein each guide rod movably penetrates through each through hole in a one-to-one correspondence.

8. The device according to claim 7, wherein each guide rod accommodating part comprises:

a linear bearing allowing each guide rod for movable one-to-one penetration such that the first plate body slides upward and downward;

a flange, which is provided at one end of the linear bearing and close to the fourth surface; and a compression spring, which is arranged in the linear bearing and away from the flange for buffering.

9. The device according to claim 8, wherein each guide rod accommodating part allows each guide rod to penetrate in a one-to-one correspondence.

10. The device according to claim 9, wherein each guide rod accommodating part comprises a plurality of locking parts; each locking part penetrates the flange and the fourth surface to fix the flange on the fourth surface.

* * * * *